(12) United States Patent
Bueter (10) Patent No.: US 11,988,233 B2
(45) Date of Patent: May 21, 2024

(54) WORKING CYLINDER

(71) Applicant: Bümach Engineering International B.V., TA Emmen (NL)

(72) Inventor: Josef Bueter, Haren/Altenberge (DE)

(73) Assignee: Buemach Engineering International B.V., TA Emmen (NL)

( * ) Notice: Subject to any disclaimer, the term of this patent is extended or adjusted under 35 U.S.C. 154(b) by 66 days.

(21) Appl. No.: 17/775,439

(22) PCT Filed: Nov. 6, 2020

(86) PCT No.: PCT/DE2020/000269
§ 371 (c)(1),
(2) Date: May 9, 2022

(87) PCT Pub. No.: WO2021/089071
PCT Pub. Date: May 14, 2021

(65) Prior Publication Data
US 2022/0397130 A1  Dec. 15, 2022

(30) Foreign Application Priority Data

Nov. 8, 2019  (DE) ..................... 20 2019 004 569.4

(51) Int. Cl.
*F15B 15/14* (2006.01)
*B23K 26/28* (2014.01)
*F15B 15/17* (2006.01)

(52) U.S. Cl.
CPC .......... *F15B 15/1442* (2013.01); *B23K 26/28* (2013.01); *F15B 15/17* (2013.01); *F15B 2215/30* (2013.01)

(58) Field of Classification Search
CPC .. F15B 2215/30; F15B 15/17; F15B 15/1442; B23K 26/28
See application file for complete search history.

(56) References Cited

U.S. PATENT DOCUMENTS

2004/0143953 A1  7/2004  Mickelson et al.

FOREIGN PATENT DOCUMENTS

| DE | 4041992 A | * | 7/1992 | ............. B23P 15/00 |
|----|-----------|---|--------|--------|
| DE | 4041992 A1 | | 7/1992 | |
| DE | 102007004666 A1 | | 7/2008 | |
| EP | 3260705 A1 | | 12/2017 | |

* cited by examiner

*Primary Examiner* — Abiy Teka
(74) *Attorney, Agent, or Firm* — Laurence A. Greenberg; Werner H. Stemer; Ralph E. Locher (57) ABSTRACT

A cylinder includes a cylinder tube, a first closure part, a second closure part, and a piston unit. The cylinder tube has a first tube end and a second tube end. The tube and end closure parts define a cylinder interior. The piston unit defines at least one working space in the cylinder interior. The first closure part is connected to the tube by a first peripheral laser ring weld and the second closure part is connected to the tube by a second peripheral laser ring weld. The laser ring welds each define a fluid-tight sealing plane. A peripheral sealing ring is located between each closure part and a tube inner wall at an axial distance from the associated laser ring weld seam. The peripheral sealing ring defines a pressure-separated ring section between the peripheral sealing ring and the associated laser ring weld seam.

6 Claims, 8 Drawing Sheets

WORKING CYLINDER

FIELD AND BACKGROUND OF THE INVENTION

The invention relates to a welded working cylinder and a method for the production thereof.

Working cylinders are known as such in different designs from the state of the art.

All such working cylinders comprise a cylinder tube and closure parts.

According to the state of the art, such working cylinders are usually produced by screwing the closure parts to the cylinder tube. Therefore, these working cylinders are also referred to as screw cylinders in the prior art.

Furthermore, it is known from the state of the art to connect the bottom closure part to the cylinder tube by MAG welding and then to screw only the guide closure part.

The threads of the cylinder tube and closure parts are usually produced by a machining process.

Both screw cylinders and cylinders with screw connection of only one closure part and MAG welding of the other closure part are provided in high quality according to the state of the art and have proven to be first-class and reliable products.

From the view of production, it must be noted that, especially for the cylinder tube, an allowance of the material thickness, i.e., the tube wall thickness, must be provided for the thread to be subtractively produced because the thread inevitably weakens the cylinder tube. However, this allowance results in a tube wall thickness that is considerably overdimensioned for the absorption of the forces during operation, the forces caused by the operating pressure of the fluid in particular. This leads disadvantageously to increased material consumption and an increased final weight of the differential working cylinder.

As a disadvantage, the machining processes for producing the thread moreover require a high degree of precision and are therefore very demanding in the production.

Furthermore, an additional seal must regularly be inserted between the cylinder tube and the respective closure part in order to achieve the tightness of the cylinders.

In addition, the final assembly requires a lot of time and skilled labour.

It is also a disadvantage that additional means must be provided to avoid the loosening of the screw connection. Finally, it is disadvantageous that, as a result of the changing operating pressures, the threads are subject to dynamic loads which limit their service life.

SUMMARY OF THE INVENTION

It is the task of the invention to provide a working cylinder which is of particularly high quality and can be produced in a material-saving, simple and thus cost-effective manner.

The task is solved by the features indicated in the independent claim. Preferred further embodiments result from the sub-claims.

According to the invention, the working cylinder comprises a cylinder tube, a first and a second closure part and a piston unit. The first closure part and the second closure part are hereinafter collectively also referred to as the closure parts.

The working cylinder according to the invention produced from these basic components may be provided in different designs. In particular, the working cylinder can be a differential working cylinder, a plunger cylinder, a synchronized cylinder, a telescopic cylinder, a traction cylinder or also a pneumatic working cylinder. If the working cylinder is designed as a synchronized cylinder, it will hereinafter also be referred to as a steering cylinder. Working cylinders within the meaning of the present invention are further understood to be, in particular, storage cylinders, gas spring cylinders and hydraulic shock absorbers.

A working cylinder according to the invention can be designed such that it is single-acting or double-acting. A differential working cylinder, for example, is a double-acting hydraulic working cylinder with two working chambers, wherein the effective piston surfaces have different sizes in the two working chambers. Thus, forces of different magnitudes act on the piston in the two actuation directions at the same operating pressure. In contrast to a differential working cylinder, the piston rod of a synchronized cylinder is guided by guide closure parts arranged on both sides so that the effective surfaces of the piston are of the same size and, consequently, forces of the same magnitude act in both actuation directions at the same operating pressure so that synchronized cylinders are used in particular as steering cylinders. A plunger cylinder, in contrast, is a single-acting working cylinder in which the pressure medium displaces the piston as a solid body and thus causes it to move outwards. The same applies to the telescopic cylinder, in which several cylinder tubes are inserted into each other, thus enabling particularly long working movements.

The cylinder tube has a hollow-cylindrical design in a manner known per se and, according to the invention, comprises a first cylinder tube end and a second cylinder tube end. After assembly, the first closure part is arranged at the first cylinder tube end and the second closure part is arranged at the second cylinder tube end. Preferably, both cylinder tube ends are manufactured in the same way. Thus, the two cylinder tube ends preferably have bevelled axial front faces, wherein the bevels have the same angle. Consequently, the axial front faces preferably have the same cross-sectional area.

However, it is also possible to manufacture differentially designed cylinder tube ends.

According to the invention, the first closure part is arranged at the first cylinder tube end. Preferably, the first closure part is a guide closure part. A guide closure part is understood to be a closure part which receives a piston unit in a sliding and sealing manner. In a differential working cylinder, for example, the piston unit can consist of a piston and a piston rod, and the piston rod is received by the guide closure part. In a plunger cylinder, the piston unit is designed as a volume-forming piston, also referred to as a plunger piston, which is received by the guide closure part.

The first closure part is designed such that it has a contact surface which, when attached to the first cylinder tube end, rests against a corresponding further contact surface of the first cylinder tube end. These contact surfaces preferably surround the first closure part and the cylinder tube completely. This results in a continuous annular surface against which the first closure part at the first cylinder tube end rests. If the annular surface is obliquely inclined, it is a truncated cone lateral surface from a geometric point of view. For the sake of simplicity and irrespective of the geometric design, this surface hereinafter simply referred to as an annular surface.

According to the invention, the second closure part is arranged at the second cylinder tube end. The contents of the description concerning the relationship of the first closure part to the first cylinder tube end apply correspondingly to the relationship of the second closure part to the second cylinder tube end. With regard to the contact surface, the second closure part is designed analogously to the first closure part. Preferably, the second closure part is a bottom closure part, which is then axially opposite the piston of the piston unit and axially delimits the at least one working chamber of the working cylinder according to the invention.

The working cylinder according to the invention further comprises the piston unit. Depending on the type of working cylinder, the piston unit can consist of a piston and a piston rod—which is the case, for example, with a differential working cylinder or a synchronized cylinder—or only of a piston—which is the case, for example, with a plunger cylinder—or it can have other designs. If the piston unit comprises a piston and a piston rod, the piston and the piston rod have a fixed positional relationship relative to each another. Preferably, the piston and the piston rod are firmly coupled to each other. In such designs, they are preferably connected in a material-bonding (integrally connected) manner by welding. The piston and piston rod can also be detachably coupled. In special cases, however, it is also possible that the piston unit is designed as a one-piece unit and, thus, the piston and piston rod are sections of a monolithic component.

In the assembled state, the cylinder tube and the closure parts form a cylinder interior according to the invention. If the cylinder tube and closure parts are joined together, their inside surface sections delimit the cylinder interior. And the cylinder interior extends to the respective laser ring weld seam.

Furthermore, in the working cylinder according to the invention, the piston unit forms at least one working chamber in the cylinder interior. This chamber is defined by the cylinder tube, a closure part and the piston unit. The piston unit is arranged such that it can be axially displaced, and the main longitudinal axis of the cylinder tube and the axial direction of movement of the piston unit coincide. In this design, the piston unit preferably passes, at least in sections, through the first closure part in a sliding and sealing manner. A pressure medium connection is assigned to the working chamber via which the pressure medium can enter the working chamber or be led out of it and, thus, the working chamber can be pressurized. The pressure medium can be a hydraulic or pneumatic pressure medium.

If the working cylinder according to the invention is, for example, designed as a differential working cylinder, the following applies in addition.

The piston of the piston unit is arranged in the cylinder interior and separates the cylinder interior into a piston crown working chamber, hereinafter also abbreviated to piston crown chamber, and a piston rod working chamber. The piston crown chamber is located between the piston and the second closure part, here designed as a bottom closure part. The piston rod working chamber is located on the side of the piston rod between the piston and the first closure part, here designed as a guide closure part. The at least one working chamber is thus the piston rod working chamber. In addition, the piston crown working chamber forms a further working chamber.

The piston can be axially displaced and arranged in the cylinder interior in such a way that the main longitudinal axes of the piston and cylinder tube overlap each other.

The pressure medium connections are provided at the cylinder such that an operating pressure can be applied to the piston crown working chamber and the piston rod working chamber.

The piston may additionally have various guide, sealing or piston rings. Various embodiments of a piston for a working cylinder are known as such from the state of the art.

The working cylinder according to the invention is particularly characterized in that both closure parts, i.e., for example, both the guide closure part and the bottom closure part in the case of a differential working cylinder, are welded to the cylinder tube.

In this case, the first closure part is joined to the cylinder tube by means of a first circumferential laser ring weld seam and the second closure part is joined to the cylinder tube by means of a second circumferential laser ring weld seam. Hereinafter, the components connected to each other are also referred to collectively as the coupling partners.

The two closure parts are joined to the cylinder tube by laser welding. The laser ring weld seams are fusion welded joints produced without the addition of filler metals.

Advantageously, laser welding forms a very narrow, tapered weld seam. The acute angle formed by the lateral flanks of the essentially V-shaped laser weld seam is preferably less than 15 degrees and in a particularly preferred design less than 10 degrees.

Each of the two laser ring weld seams forms a fluid-tight sealing plane. This means that the first laser ring weld seam prevents the pressure medium from passing the connection point between the cylinder tube and the first closure part, and the second ring weld seam prevents the pressure medium passage between the cylinder tube and the second closure part, and all this without the need for additional sealing means, such as a sealing ring.

The cylinder tube and closure parts as well as preferably also the piston unit each are made of a metal alloy and, particularly preferably, of a steel alloy. However, the material composition of the individual components may differ slightly. Preferably, the mass proportions of the components of the metal alloy of the cylinder differ from those of the closure parts by less than 10 weight percent. Thus, the closure parts and the cylinder tube have similar physical properties and can be welded together particularly well.

The steel alloy preferably used has a carbon content of less than 0.5 weight percent. The alloy components vanadium, chromium and manganese are preferably contained separately or in combination in a proportion from 0.01 to 2 weight percent.

The working cylinder is further characterized in that a first circumferential sealing ring is arranged in the cylinder interior between the first closure part and a cylinder tube inner wall of the cylinder tube at its first cylinder tube end at an axial distance from the first laser ring weld seam, said first circumferential sealing ring forming a first pressure-separated annular section, which is arranged between the first circumferential sealing ring and the first laser ring weld seam and/or in that a second circumferential sealing ring is arranged in the cylinder interior between the second closure part and a cylinder tube inner wall of the cylinder tube at its second cylinder tube end at an axial distance from the second laser ring weld seam, said second circumferential sealing ring forming a second pressure-separated annular section which is arranged between the second circumferential sealing ring and the second laser ring weld seam.

That means that according to this further development, a circumferential sealing ring is integrated upstream of at least one laser ring weld seam. Preferably, a circumferential sealing ring is arranged upstream of both laser ring weld seams. Hereinafter, the circumferential sealing ring is also referred to as an O-ring.

In the cylinder interior, the O-ring separates an annular section in front of the respective laser ring weld seam from the rest of the cylinder interior in a pressure-tight manner. It was surprisingly found that by the formation of a laser ring weld seam, the energy input per unit length can be set so low that a thermally sensitive O-ring is not damaged even in close proximity to the laser ring weld seam. Close proximity is understood to be an axial distance between the laser ring weld seam and the O-ring that is smaller than an internal cylinder tube diameter and, in a particularly preferred design, not more than the fourfold of a cylinder tube wall thickness.

The O-ring causes the separation of the annular section from the working pressure of the pressure medium. Thus, the annular section is an axial section of the cylinder tube directly in front of and at the laser ring weld seam which is not subject to the working pressure of the pressure medium from the inside and is therefore not subject to buckling load. In this way, a radial load on the laser ring weld seam, which would otherwise occur, is simultaneously avoided in an advantageous manner by a very simple means. Instead, only the axial load is applied. The axial load is based on the working pressure of the pressure medium acting on the base area of the respective closure part. Thus, a multi-axial load on the laser ring weld seam and consequentially a multi-axial material stress there are advantageously avoided.

At the same time, the upstream O-ring protects the at least one working chamber or, depending on the type of working cylinder with O-rings on both sides, both working chambers from contamination. Any emissions occurring during laser welding or particles that could detach from the coupling partners in the area of the laser weld seam are retained in the respective annular section by the O-ring before entering the working chamber.

The welded working cylinder according to the invention has a number of considerable advantages compared to working cylinders of the prior art.

A first significant advantage is that in particular the cylinder tube requires little or no machining apart from cutting to length. In particular, threads have not to be cut or grooves to be turned. In the case of a welded piston unit, this advantage also applies to the piston rod.

This has the direct benefit that the otherwise necessary amount of time, processing machines, tool costs and energy for machining can be saved.

Furthermore, there is the advantage of drastic material savings and thus the preservation of raw material resources because the cylinder tube has to have only about half the tube wall thickness of a screwed differential working cylinder. Allowances, for example in the tube wall thickness to compensate for the material removal for a cut thread, can be omitted.

By the omission of machining the cylinder tube and preferably also the piston rod, the quality is also significantly increased. As a result of the omission of the force input due to machining, the axial concentricity is no longer impaired. Rather, the axial concentricity of the starting products for the cylinder tubes and, if applicable, also of the piston rods is completely maintained. Consequently, the working cylinder according to the invention has a higher precision. Thus, the axial piston rod movement can also be provided without the problem of buckling of the piston rods in the end stop, which is known in the prior art. At the same time, this reduces the wear of the cylinder guides in the guide closure part. By the omission of machining the cylinder tube and, if applicable, the piston rod, reductions in the load capacity due to notch effects are also avoided.

Another advantage is the absolute tightness of the differential working cylinder at the connection points between the cylinder tube and the closure parts. In this respect, it is additionally advantageous that the tightness can be achieved without the seals otherwise required according to the state of the art. The possible omission of these components, which are prone to ageing, results not only in cost savings but also in an improvement in quality and an increase in service life. Moreover, contamination due to ageing seals is excluded.

A further advantage is the increased operational safety. An axial play between the cylinder tube and the closure parts during load changes and loosening, as it is the case with threads, are excluded. Moreover, savings resulting from the omission of otherwise necessary securing elements are advantageously achieved. Finally, the otherwise necessary securing of the actual securing elements required for detachable connections is also omitted. According to the prior art, such securing is obtained, for example, by gluing the securing elements. The omission of gluing leads to further important advantages. Firstly, the costs for the very expensive screw locking adhesives are eliminated. Secondly, there is no need to clean the surfaces to ensure their adhesion to the screw locking adhesives, which, according to the state of the art, often requires cleaning chemicals that are hazardous to health. This eliminates the need for special measures to ensure health protection and environmental protection. Thirdly, the problem that detachable connections, even when secured by screw locking adhesives, can be subject to the risk of loosening under impact loads is overcome.

Another aspect of increased operational safety is the increased resistance to manipulation. Non-destructive interventions in the cylinder interior are excluded. Possible sources of injury in connection with improper opening or improper reassembly of a differential working cylinder by untrained personnel are eliminated.

Moreover, the working cylinder according to the invention has advantages concerning manufacturing. In particular, it is possible to weld both closure parts, since access to the cylinder interior is no longer required after welding in contrast to the state of the art. This is due to the fact that the laser welding process only causes localised heating of the material in the area of the laser ring weld seams. This means that components with thermally sensitive materials, such as seals in particular, which would be damaged by other welding methods, can still be welded at a distance of few millimetres to the planned weld seam. In addition, scaling on the inner surface sections of the cylinder tube and the closure parts, particularly in the vicinity of the weld seams, which would otherwise occur has to be removed with great effort according to the state of the art, is avoided.

Secondly, this is due to the fact that any material emissions from the area of the laser ring weld seam are retained by the upstream O-ring in the annular area.

Preferably, the working cylinder according to the invention also makes it possible to weld both closure parts in one operational step.

Another advantage is the reduction of thermal stresses in the coupling partners of the welded joint, since only a relatively small amount of energy input per unit length (amount of energy related to the length of the weld seam) has to be supplied in the case of laser welding.

Another advantage is that the contour, the weld seam depth and the angle of the laser ring weld seams can be determined to a large extent by the movement, the energy input per unit length and the angle of the laser beam relative to the working cylinder to be produced. Thus, the contour and angle can be specifically aligned by changing the position of the laser relative to the coupling partners.

Moreover, a particular advantage is an extremely long service life, as the upstream O-ring largely protects the laser ring weld seams from dynamic radial loads due to the changeable working pressure of the pressure medium and, thus, from multi-axial stresses. Under the condition of the same dimensioning, the advantageously exclusive axial loads allow a significantly higher amount of load changes and thus a significantly longer service life.

In a first particularly preferred embodiment of the working cylinder according to the invention, the working cylinder is provided as a double-acting working cylinder and designed as a differential working cylinder.

In this embodiment, the first closure part is designed as a guide closure part and the second closure part is designed as a bottom closure part. Therefore, the first cylinder tube end is referred to as the guide-side cylinder tube end and the second cylinder tube end is referred to as the bottom-side cylinder tube end herein. Thus, the first laser ring weld seam is arranged between the guide closure part and the guide-side cylinder tube end, and the second laser ring weld seam is arranged between the bottom closure part and the bottom-side cylinder tube end.

In a differential working cylinder, the piston unit comprises a piston and a piston rod. With regard to the structure of the piston unit designed in this way, reference is made to the above contents of the description of the working cylinder.

The piston of the piston unit is arranged in the cylinder interior and thus separates the cylinder interior into a piston crown working chamber, hereinafter also abbreviated to piston crown chamber, and a piston rod working chamber, also abbreviated to piston rod chamber. The effective area of the piston in the piston crown chamber is greater on the piston crown side of the piston than on the piston rod chamber side of the piston. Thus, a greater force acts on the piston on the piston crown side than on the piston rod side at the same pressure of the pressure medium. A force acting on the piston is transmitted from the cylinder interior to the outside by means of the piston rod, which slidably passes through the guide closure part for this purpose.

In a second particularly preferred embodiment of the working cylinder according to the invention, the working cylinder is also provided as a double-acting working cylinder; however, in this embodiment it is designed as a synchronized cylinder.

In the synchronized cylinder according to this advantageous further development, the first closure part is designed as a guide closure part, as in the case of a differential working cylinder. In addition, and as a special feature, the second closure part is also designed as a further guide closure part. The guide closure part and the further guide closure part are hereinafter collectively also referred to as the guide closure parts. Thus, the first laser ring weld seam is arranged between the guide closure part and the first cylinder tube end and the second laser ring weld seam is arranged between the further guide closure part and the second cylinder tube end.

In this design, the piston unit also comprises a piston and a piston rod. The piston is arranged in the cylinder interior and separates it into a first and a second piston rod working chamber. For this purpose, the piston rod projects axially over the piston on both sides and is guided out of the piston interior on both sides through the closure parts, which are both provided as guide closure parts here. Thus, the piston rod slidably passes through both guide closure parts.

Both piston rod working chambers have the same cross-section and thus the piston has effective surfaces of the same size on both sides for the pressure medium. The force acting on the piston and the length of the working stroke executed by the piston are the same in each case, regardless of whether a certain pressure flow of the pressure medium, which is identical in terms of pressure and volume, acts on the first or the second piston rod working chamber. Due to this identical behaviour in both actuation directions, the synchronized cylinder is often also used as a steering cylinder and is therefore also referred to as a steering cylinder.

According to another further development, the working cylinder is designed as a plunger cylinder. This is a single-acting working cylinder.

According to this further development, the first closure part is designed as a guide closure part and the second closure part is designed as a bottom closure part. The first cylinder tube end is a guide-side cylinder tube end and the second cylinder tube end is a bottom-side cylinder tube end. As it is the case with a differential working cylinder, the first laser ring weld seam is thus arranged between the guide closure part and the guide-side cylinder tube end, and the second laser ring weld seam is thus arranged between the bottom closure part and the bottom-side cylinder tube end.

The piston unit of the plunger cylinder is formed by a plunger piston. The plunger is arranged in the cylinder interior. Only one working chamber is formed in the cylinder interior. The plunger piston slidably passes through the guide closure part. When a pressure flow of the pressure medium is applied to the working chamber, the plunger is axially displaced correspondingly to the introduced volume of the pressure flow and performs an outward movement. The inward movement is caused by a force acting from the outside in the opposite direction.

According to another advantageous further development, the laser ring weld seams have a laser ring weld seam depth which has a ratio of 1.1 to 2.5 relative to a cylinder tube wall thickness.

If the laser ring weld does not run perpendicular through the cylinder tube wall, the laser ring weld seam depth is greater than the thickness of the cylinder tube wall.

Thus, the connection between the closure parts has a particularly advantageous higher stability, as the force transmission in the weld seam is distributed over a larger area and is therefore optimized.

This results in the further advantage that the tube wall thickness of the cylinder tube can even be more reduced for specific applications.

In addition, according to this advantageous further development, it is also possible to make the laser ring weld seam depth greater than the cylinder tube wall thickness, even with a substantially vertical alignment of the weld seam, by introducing the laser ring weld seam deeper into the closure part than the cylinder tube is thick. This results in a deeper weld seam root. Preferably, the laser ring weld depth is at least 1.2 times the cylinder tube thickness. It was surprisingly found that the structural changes in the closure part caused in this way increase the load-bearing capacity of the ring weld seams.

According to a further advantageous further development, the laser ring weld seams have an inclined laser ring weld seam center axis.

According to the same advantageous further embodiment, the laser ring weld seam center axis and a main longitudinal axis of the cylinder tube include a laser ring weld inclination angle alpha, wherein alpha is between 20 and 70 degrees.

The laser ring weld seam center axis extends centrally through the laser ring weld seam and divides the cross-section thereof into equal parts. If the laser ring weld seam center axis is extended up to the main cylinder tube longitudinal axis, which runs centrally and along the cylinder tube, it and the main longitudinal axis form an angle. This angle is the laser ring weld seam inclination angle alpha.

The laser ring weld seam inclination angle alpha is between 20 and 70 degrees so that the laser ring weld seam depth is produced with a ratio of 1.1 to 2.5 relative to the cylinder tube wall thickness.

Thanks to the greater laser ring weld seam depth and the obliquely inclined ring weld seam center axis, the forces are better distributed during a load due to the angle and the area of application of the attacking forces.

According to another advantageous further development, at least one of the laser ring weld seams is arranged axially on the front face side, and the ring weld seam inclination angle alpha is 180 degrees.

Thus, the laser ring weld seam has a cylindrical shape and hence it is arranged radially between the cylinder tube and the respective closure part.

This further development has the particular advantage that the annular front face of the cylinder tube does not require any special machining. Rather, only the edge of the inner lateral surface of the cylinder tube forms the contact surface to the respective closure part and consequently the surface to be welded for the laser ring weld seam. Furthermore, the respective closure part can advantageously be formed without a radial step. The outer diameter of the closure part only has to correspond to the inner diameter of the cylinder tube, which results in considerable material savings. In addition, little precision is required when defining the length of the cylinder tube, since the exact distance between the two closure parts can be precisely adjusted during joining.

According to another advantageous further development, the angle of inclination of the ring weld seam is 90 degrees. From the production view, this further development has the advantage that the annular front face formed by cutting the length of the cylinder tube can already be used as the contact surface to the respective closure part without any further work steps.

In general, the various advantageous further developments of the formation of the laser ring weld seams are not limited to specific cylinder types. In addition, different designs of the laser ring weld seams can also be combined for one and the same working cylinder.

The invention is described as an exemplary embodiment in more detail by means of the following figures. They show.

BRIEF DESCRIPTION OF THE FIGURES

DETAILED DESCRIPTION OF THE INVENTION

Figure 1:
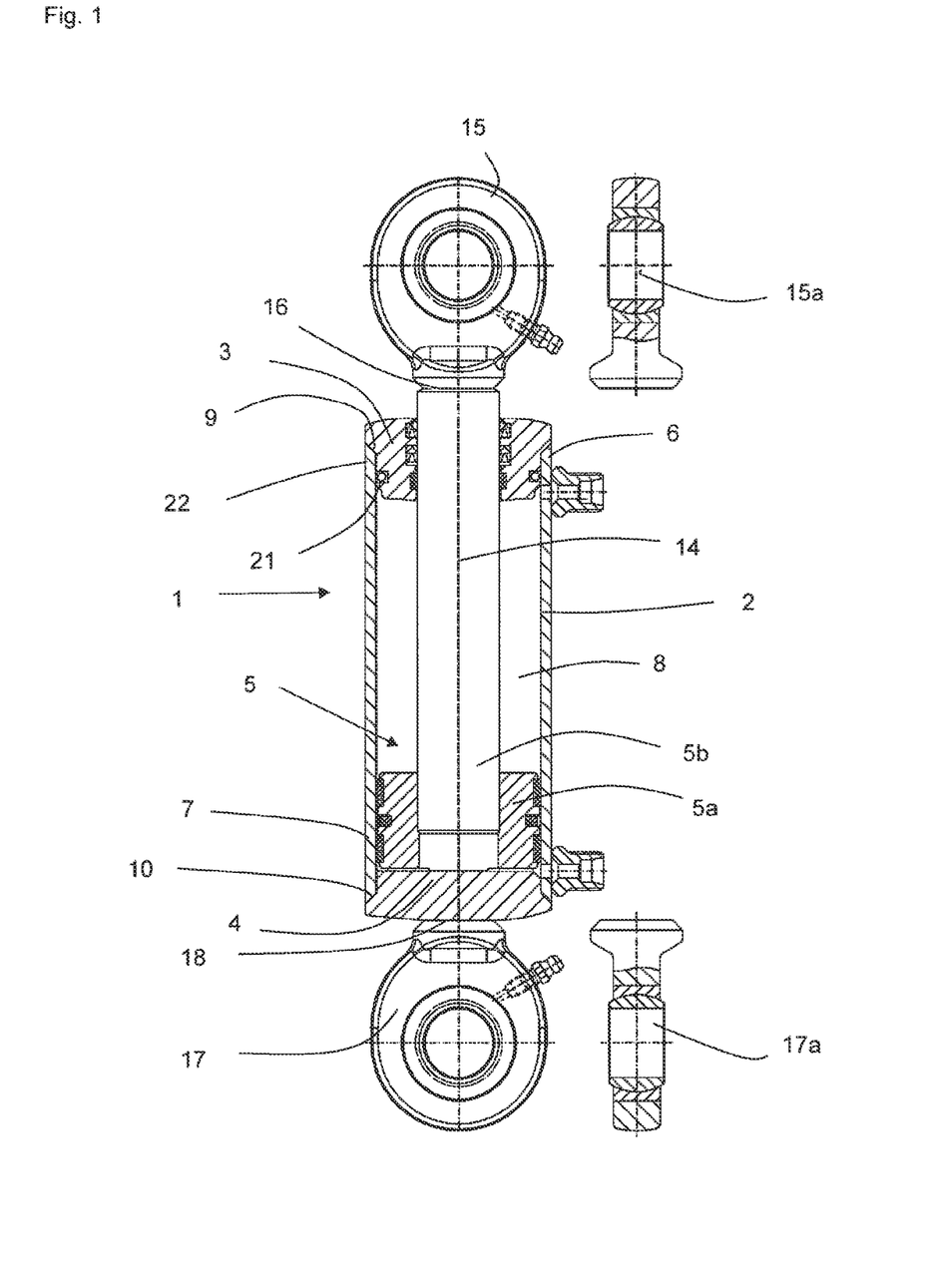
FIG. 1 Differential working cylinder (overview)

FIG. 1 shows an overview of an embodiment of the working cylinder 1 designed as a differential working cylinder. The differential working cylinder 1 comprises the cylinder tube 2, the first closure part 3, here designed as a guide closure part, the second closure part 4, here designed as a bottom closure part, and the piston unit 5. The piston unit consists of the piston 5a and the piston rod 5b.

In this embodiment, the piston-rod-side fastening module 15 is arranged at the piston rod 5b and the bottom-side fastening module 17 is arranged on the second closure part 4 designed as a bottom closure part. Fastening bolts 15a, 17a are assigned to each of the two fastening modules 15, 17. The fastening bolts 15, 17 are not elements of the invention and are shown merely for the sake of clarity.

The piston unit 5 is arranged in relation to the piston 5a and with sections of the piston rod 5b in the cylinder interior 8, and the piston rod 5b slidably passes through the first closure part 3 designed as a guide closure part.

The first closure part 3, designed as a guide closure part, closes the cylinder tube 2 at the first cylinder tube end 6, here the guide-side cylinder tube end, and the second closure part 4, designed as a bottom closure part, closes the second cylinder tube end 7, here the bottom-side cylinder tube end.

In this embodiment, the two closure parts 3, 4 are designed such that they have a cylindrical section which projects partially in a precisely fitting manner into the cylinder tube. The laser ring weld seams 9, 10 run along the contact surfaces, wherein the first laser ring weld seam 9 connects the first closure part 3 to the first cylinder tube end 6 and the second laser ring weld seam 10 connects the second closure part 4 to the second cylinder tube end 7. Each of the laser ring weld seams 9, 10 forms a fluid-tight sealing plane. In addition, a circumferential sealing ring 21 is arranged axially in front of the first laser ring weld seam 9 in the direction of the cylinder center in an annular groove (no reference numeral) of the first closure part 3. From an axial point of view, the annular section 22, here being the first annular section, is located between the sealing ring 21 and the laser ring weld seam 9.

The main longitudinal axis 14 of the cylinder tube 2 runs centrally and longitudinally through the working cylinder 1.

Figure 2:
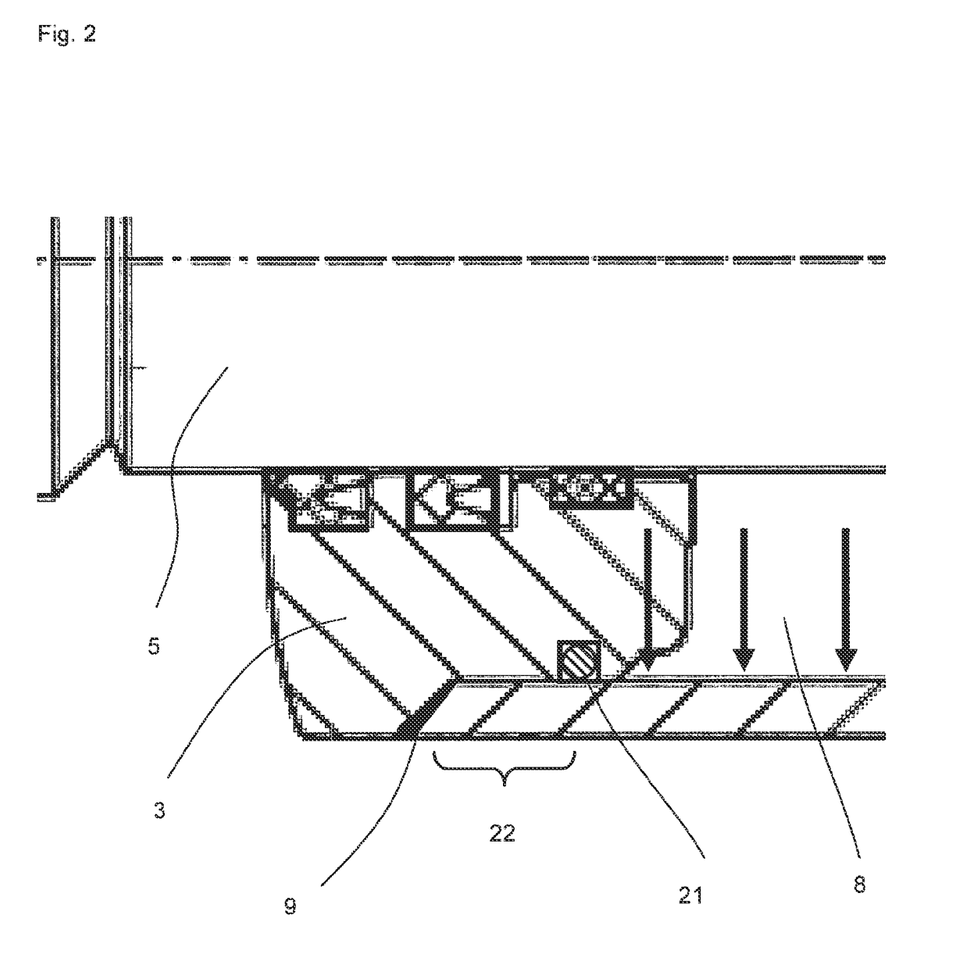
FIG. 2 Enlarged detail at the guide-side cylinder tube end with representation of the sealing ring and the annular section FIG. 3 Enlarged detail at the bottom-side cylinder tube end with representation of the ring weld seam inclination angle FIG. 4 Enlarged view of a laser weld seam to show the cross-section and the ring weld seam angle beta FIG. 5 Plunger cylinder with 90-degree weld seam and upstream O-ring FIG. 6 Enlarged detail to FIG. 5 to show the O-ring and the annular section FIG. 7 Schematic representation of a bottom closure part with 0-degree weld seam FIG. 8 Enlarged section view of a receiving contour in the closure part.

FIG. 2 shows an enlarged detail of the area of the first laser ring weld seam 9. Here, the circumferential sealing ring 21 is shown in particular in its positional relationship to the cylinder tube 2, the first closure part 3 and the first laser ring weld seam 9. The circumferential sealing ring 21 is inserted in a circumferential outer ring groove of the first closure part 3. It seals the area up to the first laser ring weld seam 9 against the rest of the cylinder interior 8 in a pressure-tight manner. The vertically drawn arrows symbolize the forces of the pressure medium acting radially from the inside on the cylinder tube 2, wherein the annular section 22 is excluded from this radial force effect thanks to the pressure-tight separation provided by the circumferential sealing ring 21.

Figure 3:
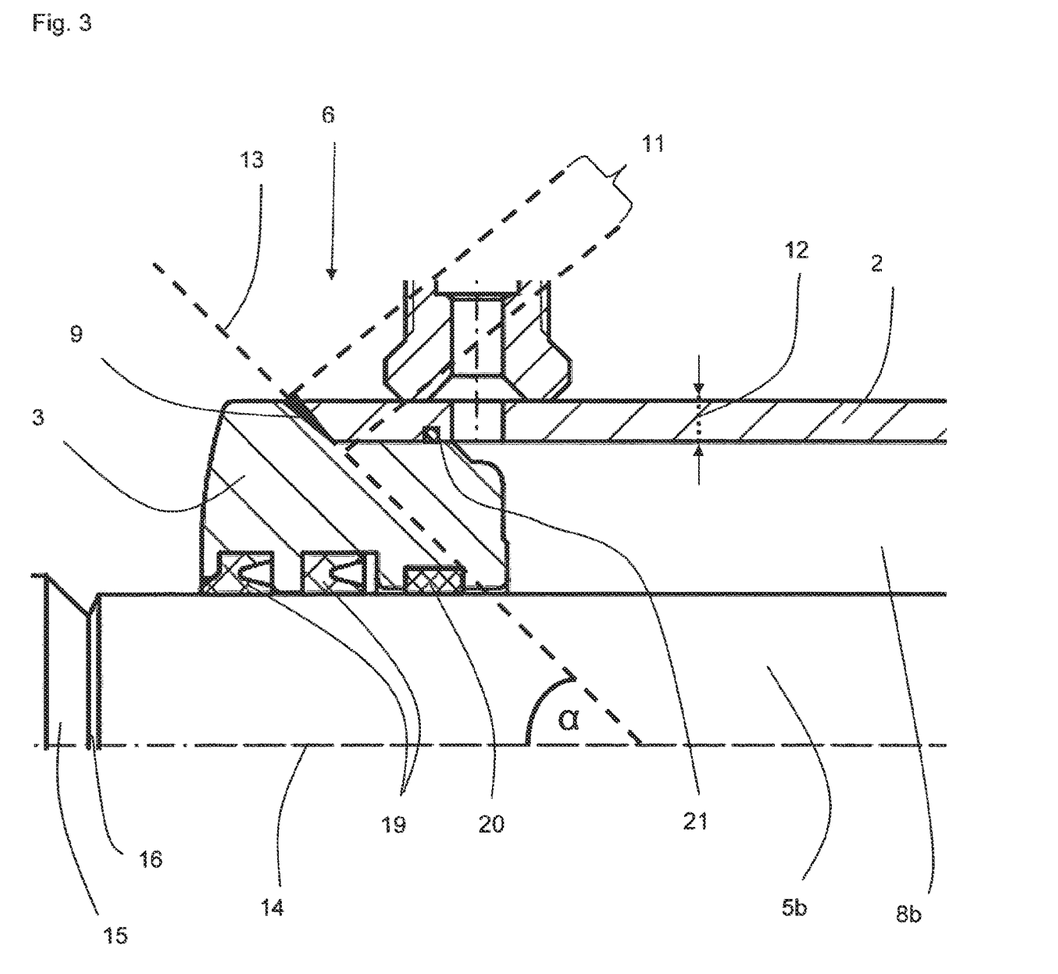

FIG. 3 shows an enlargement of the area of the first cylinder tube end 6. As in FIG. 2, this is the guide-side cylinder tube end. Here, the geometric relationships of the first circumferential laser ring weld seam 9 are shown in particular. During welding, the first circumferential laser ring weld seam 9 is produced with a laser along the ring weld seam center axis 13. This first weld seam runs along the contact surface between the first cylinder tube end 6 and the first closure part 3. For this purpose, a previously assembled and temporarily fixed pre-assembly group consisting of the cylinder tube 2, the first closure part 3, the second closure part 4, the piston unit 5 and the two fastening modules 15, 17 is preferably rotated around the main longitudinal axis of the cylinder tube 14 and in front of a laser inclined at the ring weld seam inclination angle alpha.

The ring weld seam center axis 13 runs centrally through the first circumferential laser ring weld seam 9 and, in its extension, it includes the ring weld seam inclination angle alpha with the main longitudinal axis of the cylinder tube 14. The ring weld seam depth 11 is the length of the ring weld seam center axis 13 which runs in the actual laser ring weld seam 9. Due to the angulation, the ring weld seam depth 11 is greater than the cylinder tube wall thickness 12. The ring weld seam depth corresponds to the hypotenuse of a right-angled triangle formed by the ring weld seam, the cylinder tube wall thickness 12 and a perpendicular.

This representation also shows the first fastening module weld seam 16 between the piston-rod-side fastening module 15 and the piston rod 5b. It is produced by means of the same laser welding method that is applied for the first circumferential laser ring weld seam 9.

Furthermore, the sliding bearing of the piston rod 5b in the first closure part 3 designed as a guide closure part is also shown with guide 20 and seal 19.

Figure 4:
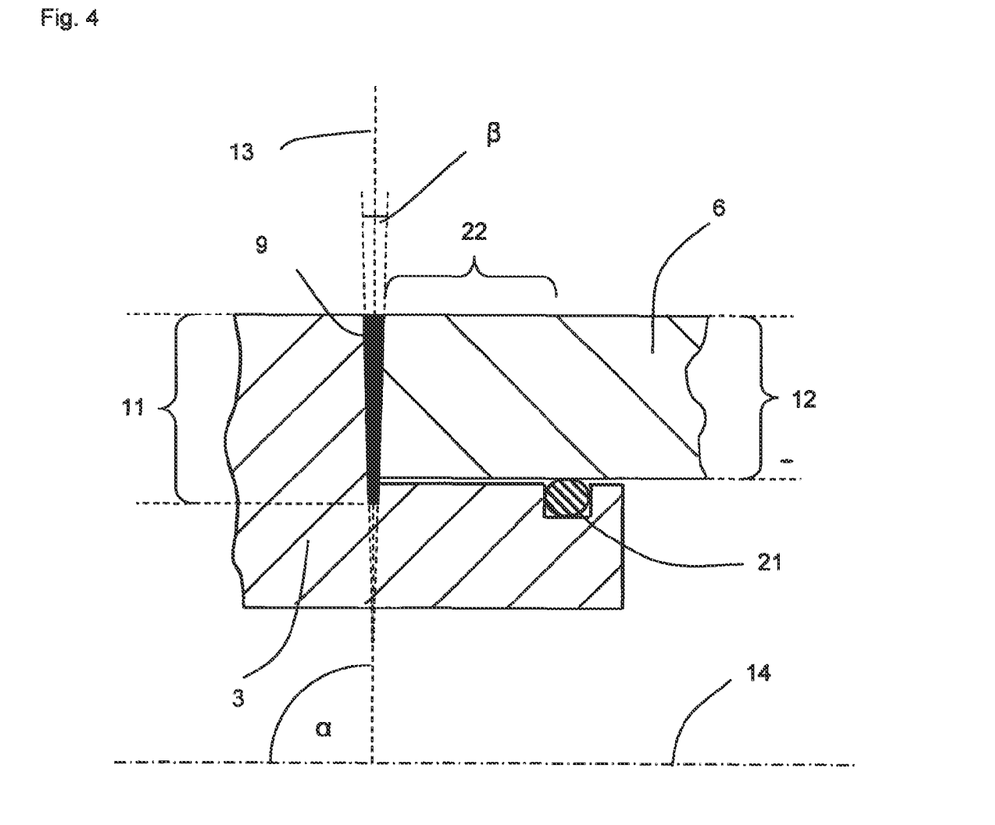

FIG. 4 represents an enlarged laser weld seam. The first laser weld seam 9, between the first cylinder tube end 2 and the first closure part 3, shown here is an exemplary laser weld seam according to the present invention.

This first laser weld seam 9 has a ring weld seam depth 11 and a ring weld seam center axis 13. In this embodiment, the ring weld seam depth 11 is greater than the cylinder tube wall thickness 12.

The laser weld seam has a slight conicity. If two tangents are put at the edge contour of the laser weld seam, they intersect and form a ring weld seam angle beta. The ring weld seam center axis 13 is simultaneously the bisecting line of the ring weld seam angle beta and, together with the main longitudinal axis 14, includes the ring weld seam inclination angle alpha. Furthermore, the ring weld seam center axis 13 runs along the contact surface of the first cylinder tube end 6 and the first closure part 3. In this embodiment, the ring weld seam inclination angle alpha is 90 degrees.

Figure 5:
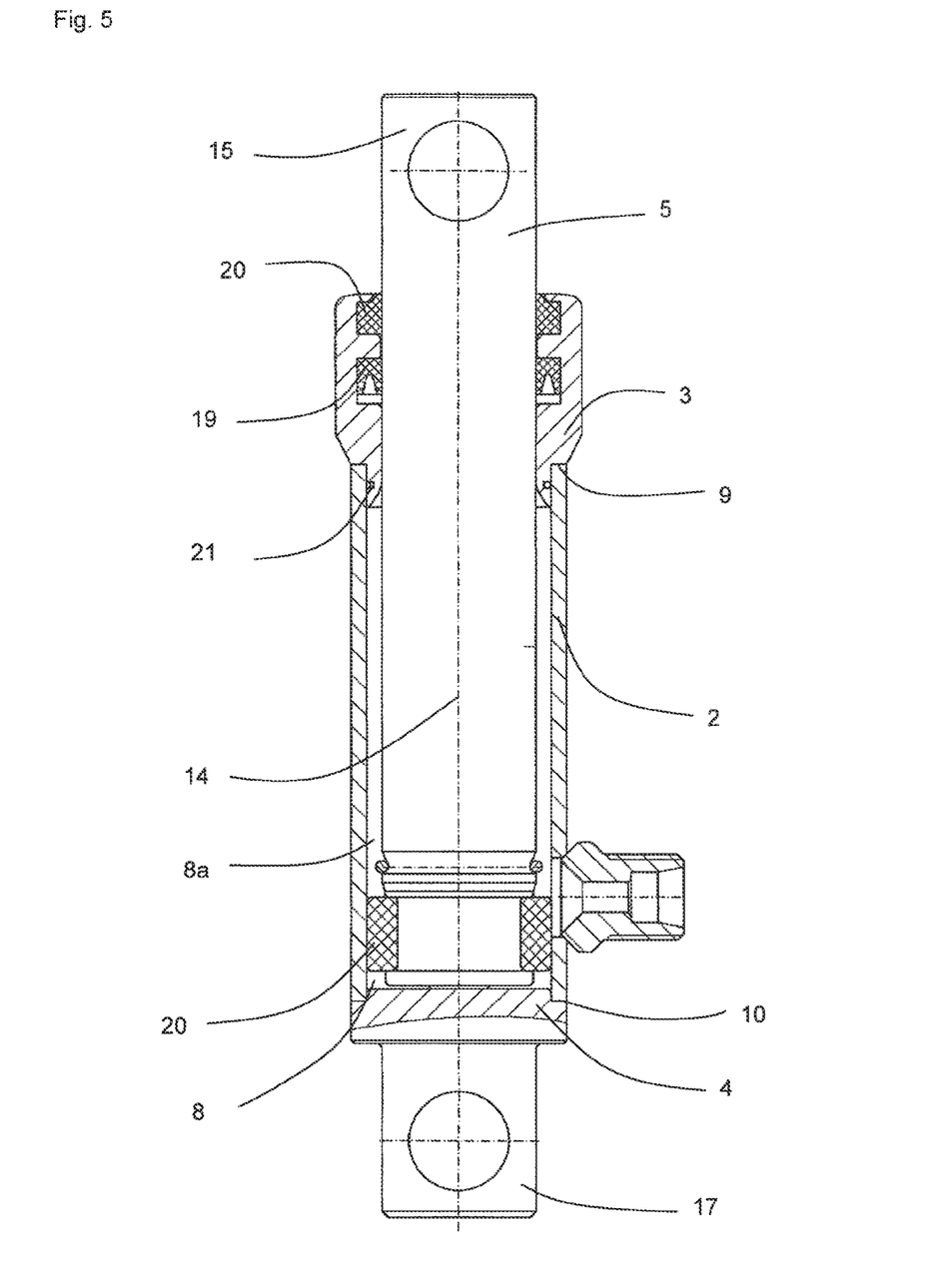

FIG. 5 shows an embodiment of a working cylinder which is designed as a plunger working cylinder. Here, the piston unit 5, which is designed as a plunger piston, is guided in the cylinder tube 2. In addition, the piston unit 5 is guided in the first closure part 3, which is designed as a guide closure part. The plunger cylinder is equipped with the guides 20 for this purpose. The guide closure part is connected to the cylinder tube 2 at its first cylinder tube end 6 by means of the first laser ring weld seam 9. Opposite the guide closure part, the second closure part 4, here designed as a bottom closure part, is connected to the cylinder tube 2 at the second cylinder tube end 7 by the second laser ring weld seam 10. In this embodiment, the two laser ring weld seams 9, 10 have a ring weld seam inclination angle of 90 degrees.

The reference numerals and descriptive contents given in FIG. 1 for a differential working cylinder apply in addition.

The plunger working cylinder in the embodiment according to FIG. 5 also comprises an additional first circumferential sealing ring 21 on the first closure part 3. This additional sealing ring 21 is also referred to as an O-ring and is arranged radially between the cylinder tube 2 and the first closure part 3 and provides a pressure-tight seal which separates the second circumferential laser ring weld seam 10 from the pressure medium in a pressure-tight manner.

Figure 6:
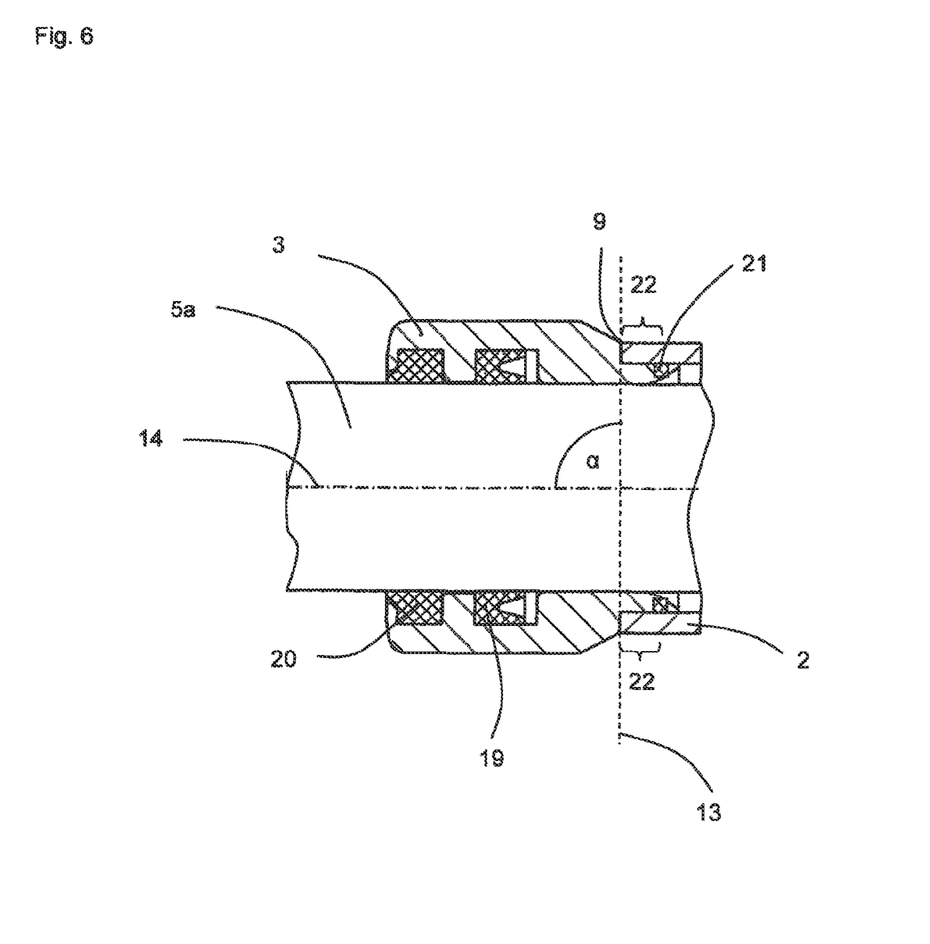

FIG. 6 shows the area of the sealing ring 21 (O-ring) on the first closure part 3 of FIG. 5 in an enlarged view. The sealing ring 21 (O-ring) is shown here in more detail and is located in spatial proximity to the first circumferential laser ring weld seam 9. In this embodiment, the sealing ring 21 (O-ring) is made of an elastic polymer. The heat input during laser welding remains sufficiently low to avoid damaging of the sealing ring 21 (O-ring) despite of its close proximity to the first laser ring weld seam 9. From an axial point of view, there is a pressure-separated annular section 22 between the sealing ring 21 (O-ring) and the first laser ring weld seam 9. In this pressure-separated annular section 22, the operating pressure of the pressure medium is not applied to the inside of the cylinder tube so that forces of the pressure medium do not act radially on the cylinder tube 2 in this area. Thus, the cylinder tube 2 is not subject to buckling forces in this area and the first laser ring weld seam 9 is relieved.

In this design, the ring weld seam center axis 13 runs perpendicular to the main longitudinal axis 14 of the working cylinder 1.

Figure 7:
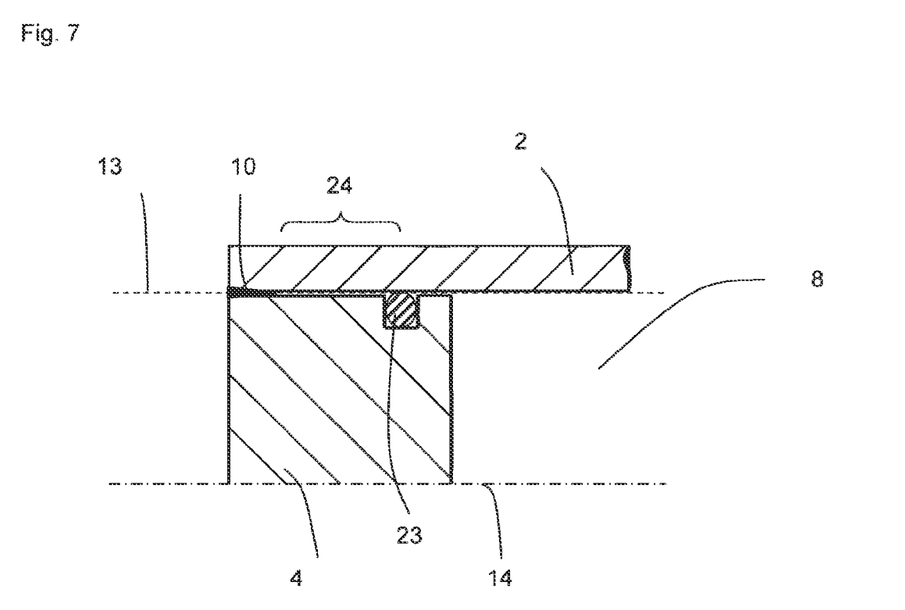

FIG. 7 is a schematic representation of a detail of an embodiment in which the second circumferential laser ring weld seam 10 runs parallel to the main longitudinal axis.

Here, the second closure part 4, designed as a bottom closure part, is radially encompassed by the second cylinder tube 2. In the embodiment, the second closure part 4 and the annular surface of the cylinder tube 2 form a common front face. However, it is also possible that one of the coupling partners axially protrudes or is set back relative to the other coupling partner.

The ring weld seam center axis 13 does not intersect the main longitudinal axis 14. The ring weld seam inclination angle alpha is 0 degrees. The second circumferential sealing ring 23 forms an axial section up to the weld root of the second laser ring weld seam 10, which is the second pressure-separated annular section 24. The second circumferential sealing ring 23 and the second pressure-separated annular section 24 are formed in the same way as the first circumferential sealing ring 21 and the first pressure-separated annular section 22 so that the contents of the description correspondingly apply also here.

Figure 8:
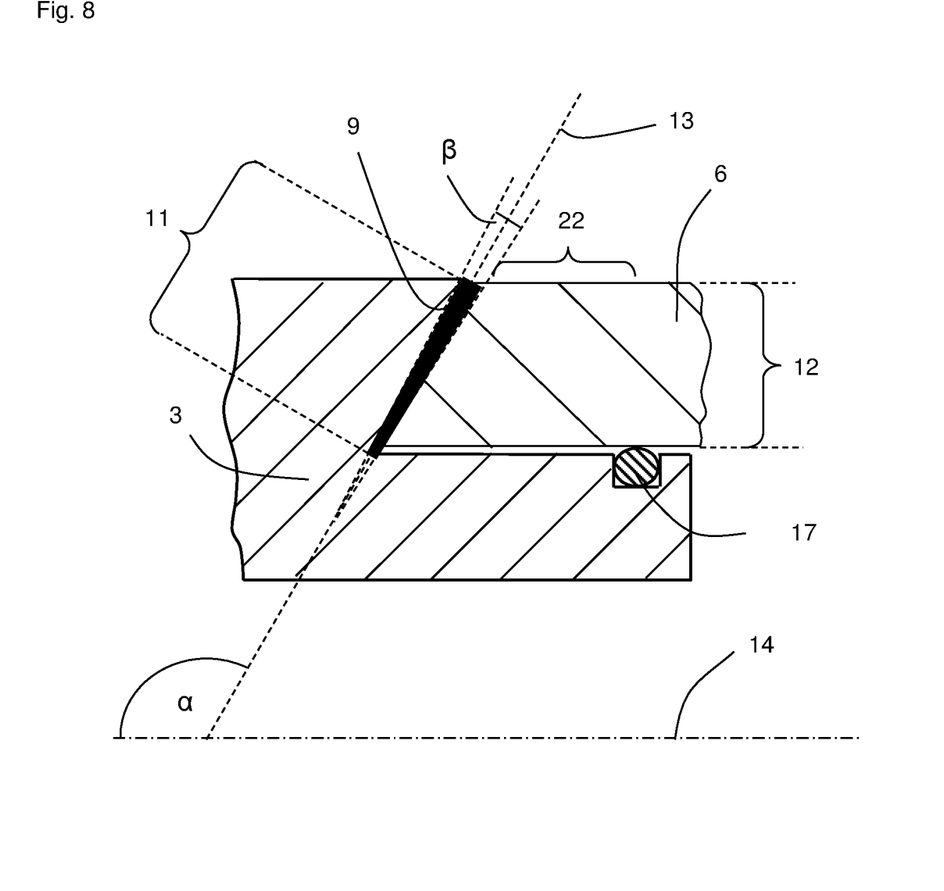

FIG. 8 shows at least one closure 3, 4 part has an axially opening, circumferential concave receiving contour in which the cylinder tube 2 engages, the receiving contour radially overlaps the cylinder tube 2, and in that the ring weld seam inclination angle α is 110 to 160 degrees

LIST OF REFERENCE NUMERALS 1 working cylinder
2 cylinder tube
2a further cylinder tube
3 first closure part
3a further closure part
4 second closure part
5 piston unit
5a piston
5b piston rod
6 first cylinder tube end
7 second cylinder tube end
8 cylinder interior
8a piston crown working chamber
8b piston rod working chamber
9 first circumferential laser weld seam 10 second circumferential laser weld seam
11 ring weld seam depth
12 cylinder tube wall thickness
13 ring weld seam center axis
14 main longitudinal axis
15 piston-rod-side fastening module
15a fastening bolts of the piston-rod-side fastening module
16 first fastening module weld seam
17 bottom-side fastening module
17a fastening bolts of the des bottom-side fastening module
18 second fastening module weld seam
19 seal
20 guide
21 first circumferential sealing ring
22 first pressure-separated annular section
23 second circumferential sealing ring
24 second pressure-separated annular section
α ring weld seam inclination angle alpha
β ring weld seam angle beta

The invention claimed is:

1. A working cylinder, comprising:
a cylinder tube, a first closure part, a second closure part and a piston unit;
said cylinder tube having a first cylinder tube end and a second cylinder tube end;
said first closure part being arranged at the first cylinder tube end and said second closure part being arranged at said second cylinder tube end, said cylinder tube and said first and second closure parts define a cylinder interior;
said piston unit defining at least one working chamber in said cylinder interior, said piston unit slidably passing through the first closure part;
said first closure part being joined to the cylinder tube in a positive-locking manner by a first circumferential laser ring weld seam, said second closure part being joined to the cylinder tube in a positive-locking manner by a second circumferential laser ring weld seam, and each of the laser ring weld seams defining a fluid-tight sealing plane, each of the laser ring weld seams having a ring weld seam depth, said ring weld seam depth having a ratio of 1.1 to 2.5 relative to a cylinder tube wall thickness;
a first circumferential sealing ring being arranged axially spaced from said first laser ring weld seam in said cylinder interior between said first closure part and a cylinder tube inner wall of said cylinder tube at said first cylinder tube end, said sealing ring defining a first pressure-separated annular section between said first circumferential sealing ring and said first laser ring weld seam, and/or a second circumferential sealing ring being arranged at an axial distance from the second laser ring weld seam in the cylinder interior between the second closure part and said cylinder tube inner wall at said second cylinder tube end, and said second circumferential sealing ring defining a second pressure-separated annular section arranged between said second circumferential sealing ring and said second laser ring weld seam.

2. The working cylinder according to claim 1, wherein said working cylinder is double-acting and is constructed as a differential working cylinder, said first closure part is constructed as a guide closure part and said second closure part is constructed as a bottom closure part, said first cylinder tube end is a guide-side cylinder tube end and said second cylinder tube end is a bottom-side cylinder tube end; said piston unit includes a piston and a piston rod, said piston is arranged in the cylinder interior and separates the cylinder interior into a piston crown working chamber and a piston rod working chamber, and said piston rod slidably passes through the guide closure part.

3. The Working cylinder according to claim 1, wherein the working cylinder is single-acting and is constructed as a plunger cylinder, said first closure part is constructed as a guide closure part and said second closure part is constructed as a bottom closure part, said first cylinder tube end is a guide-side cylinder tube end and the second cylinder tube end is a bottom-side cylinder tube end, said piston unit is a plunger piston with a plunger, the plunger is arranged in the cylinder interior and defines a working chamber in the cylinder interior, and said plunger slidably passes through said guide closure part.

4. The working cylinder according to claim 1, wherein each of said laser ring weld seams has a ring weld seam center axis, said ring weld seam center axis and a main longitudinal axis of the cylinder tube include a ring weld seam inclination angle of 20 to 70 degrees.

5. The working cylinder according to claim 1, wherein at least one of the laser ring weld seams is arranged axially on a front face and the ring weld seam is parallel to a longitudinal axis of said cylinder tube.

6. A working cylinder, comprising:
a cylinder tube, a first closure part, a second closure part and a piston unit;
said cylinder tube having a first cylinder tube end and a second cylinder tube end;
said first closure part being arranged at the first cylinder tube end and said second closure part being arranged at said second cylinder tube end, said cylinder tube and said first and second closure parts define a cylinder interior;
said piston unit defining at least one working chamber in said cylinder interior, said piston unit slidably passing through the first closure part;
said first closure part being joined to the cylinder tube in a positive-locking manner by a first circumferential laser ring weld seam, said second closure part being joined to the cylinder tube in a positive-locking manner by a second circumferential laser ring weld seam, and each of the laser ring weld seams defining a fluid-tight sealing plane;
a first circumferential sealing ring being arranged axially spaced from said first laser ring weld seam in said cylinder interior between said first closure part and a cylinder tube inner wall of said cylinder tube at said first cylinder tube end, said sealing ring defining a first pressure-separated annular section between said first circumferential sealing ring and said first laser ring weld seam, and/or a second circumferential sealing ring being arranged at an axial distance from the second laser ring weld seam in the cylinder interior between the second closure part and said cylinder tube inner wall at said second cylinder tube end, and said second circumferential sealing ring defining a second pressure-separated annular section arranged between said second circumferential sealing ring and said second laser ring weld seam; and
at least one closure part having an axially opening, circumferential concave receiving contour in which the cylinder tube engages, said receiving contour radially overlapping the cylinder tube, and in that a ring weld seam inclination angle alpha is 110 to 160 degrees.

* * * * *